United States Patent
Kawano et al.

[11] Patent Number: 6,160,771
[45] Date of Patent: Dec. 12, 2000

[54] OBJECTIVE LENS DRIVE DEVICE AND METHOD OF MANUFACTURING THE SAME

[75] Inventors: Noriyuki Kawano, Niigata; Nobuo Uekusa; Yasuhiro Terasaki, both of Chiba, all of Japan

[73] Assignee: TDK Corporation, Tokyo, Japan

[21] Appl. No.: 09/021,820

[22] Filed: Feb. 11, 1998

[30] Foreign Application Priority Data

Feb. 12, 1997 [JP] Japan ................................... 9-027780
Mar. 25, 1997 [JP] Japan ................................... 9-071142

[51] Int. Cl.$^7$ ....................................................... G11B 7/09
[52] U.S. Cl. ...................................... 369/44.15; 369/44.14
[58] Field of Search ............................ 369/44.14, 44.15, 369/44.16, 44.19, 112; 359/824, 814, 823, 813

[56] References Cited

U.S. PATENT DOCUMENTS 5,602,808  2/1997  Futagawa et al. ............... 369/44.15 X
5,657,172  8/1997  Shibata et al. .................... 369/44.15 X
5,663,840  9/1997  Matsui .............................. 369/44.15 X

FOREIGN PATENT DOCUMENTS 0 773 539 A1  5/1997  European Pat. Off. .
2-232824  9/1990  Japan .
7-105551  4/1995  Japan .

*Primary Examiner*—Muhammad Edun
*Attorney, Agent, or Firm*—Oblon, Spivak, McClelland, Maier & Neustadt, P.C.

[57] ABSTRACT

An objective lens drive device has a movable section which has an objective lens and is supported by wires extended from a stationary section, and the wires which are positioned by guide holes formed in the movable section or stationary section. In the device, the wires are fixedly positioned in such a manner that the wires are in contact with the inner walls of the guide holes.

16 Claims, 12 Drawing Sheets

OBJECTIVE LENS DRIVE DEVICE AND METHOD OF MANUFACTURING THE SAME

BACKGROUND OF THE INVENTION

This invention relates to an optical pickup for recording data on a recording medium, namely, an optical disk and reproducing data from the latter, and more particularly to an objective lens drive device in an optical pickup device in which a movable section with an objective lens is held by wire suspension wires, and to a method of manufacturing the device.

In general, an optical pickup device comprises an optical system which projects a laser beam on an optical disk through an objective lens, and detects a light beam reflected from the optical disk, and an objective lens drive device which moves the objective lens in the focusing direction or the tracking direction of the optical disk.

The aforementioned optical system comprises a light source and a light receiving section. On the other hand, the objective lens drive device comprises a movable section and a stationary section which is fixedly mounted on a mounting base.

The stationary section has a magnetic circuit including a permanent magnet and a yoke. On the other hand, the movable section has an objective lens, a focus coil, and a tracking coil. The movable section is generally supported by some method. A typical example of the movable section supporting method is that the movable section is supported with four suspension wires (hereinafter referred to as "a wire support type", when applicable)(cf. Unexamined Japanese Patent Publication 1-54035 (1989) or 2-232824 (1990).

FIG. 1 shows a typical objective lens drive device of wire support type. In the objective lens drive device, a lens holder (or movable section) 12 having an objective lens 12 is supported by four suspension wires 1 extended from a stationary section 2. The suspension wires are used for supplying current to a focusing coil and a tracking coil. The suspension wires 1 are connected to those coils through holder substrates 5. The suspension wires 1 are fixedly secured to the holder substrates 5 by soldering (at indicated at 6).

In order to accurately perform a data recording and reproducing operation with respect to an optical disk, it is essential that the optical axis of the objective lens is perpendicular to the optical disk. For instance, in the case where, when the movable section (having the objective lens) of the objective lens drive section is moved in the focusing direction, the optical axis of the objective lens is inclined, a comatic aberration occurs, and the signal jitter is increased.

Hence, the objective lens drive device is so mounted on the mounting stand that the optical axis of the objective lens is perpendicular to the surface of the optical disk. Accordingly, in the movable section, the supporting mechanism is so designed that the aforementioned relation is kept unchanged even when the movable section (having the objective lens) of the objective lens drive section is moved in the focusing direction or tracking direction.

In the objective lens drive device of the above-described wire support type, the optical axis of the objective lens is kept perpendicular to the surface of the optical disk even in the case where the movable section is moved in the focusing direction or in the tracking direction if the lengths of the wires supporting the movable section or the wire distances between the ends of them are equal to one another.

However, the lengths of the wires supporting the movable section or the wire distances between the parts of the wires which are near the ends thereof are liable to be fluctuated. The occurrence of fluctuation in wire length or wire distance will be described with reference to FIG. 11.

FIG. 11 shows suspension wires 1 supporting the movable section both ends of each of which are fixed. First ends of the wires 1 are secured to a holder substrate 5 by soldering (as indicated at 6) which is provided for a lens holder, while the remaining second ends of the wires 1 are secured to a base substrate 8 by soldering as indicated at 7.

The first ends of the suspension wires 1 are inserted into guide holes 3a formed in a wire guide section 3 of the lens holder, while the second ends of the wires are inserted into guide holes 2a formed in a wire base 2. In this connection, since members such as the lens holder and the wire base 2 are generally formed with metal molds, it is difficult to form the guide holes 2a which is extremely small in diameter (equivalent to the suspension wires). Even if the diameter d2 of the guide holes can be formed to be the same with the diameter d1 of the suspension wires, the suspension wires, which are fine and tends to be bent, are difficult to smoothly insert into the guide holes. That is, the diameter d2 of the guide holes 2a is about twice as large as the diameter d1 of the wires 1 (for instance d1=80 µm, and d2=150 µm).

Hence, the fixed position of each of the wires 1 is fluctuated as much as the gap between the guide hole 2a and the wire 1. Because of this fluctuation, the lengths of the suspension wires, and the distances L1 and L2 between the parts of the suspension wires 1 which are near the ends thereof are different from one another.

Furthermore, in the objective lens drive device of wire support type, the suspension wires 1 are surrounded by damping material 4 to suppress the low frequency resonance thereof. However, merely by surrounding the wires 1 with the damping material 4, it is impossible to sufficiently suppress the high frequency resonance attributing to pitching and yawing. Hence, in the objective lens drive device disclosed by Unexamined Japanese Patent Publication 7-105551/(1995), as shown in FIG. 12 the wire 1 is bent in the focusing direction, thereby to effectively suppress the high frequency resonance.

As was described above, in the case where the wire 1 is bent in the focusing direction, the high frequency resonance attributing to pitching and yawing can be effectively suppressed. However, the objective lens drive device suffers from the following difficulties:

The wire 1 must be fixedly secured by soldering under the condition that it has been bent to a certain extent. This work is rather troublesome.

In order to electrically connect the suspension wires 1 by fixing both ends of each of the suspension wires 1, it is necessary to arrange printed circuit boards (relaying substrates) at the parts of the wires where the latter are fixed. This fact obstructs the reduction in manufacturing cost of the device. That is, the device is large in the number of components, and high in component cost.

In the case where the suspension wires 1 are fixedly secured by soldering (as indicated at 6), or in the case where the suspension wire 1 is bent in the focusing direction, the distance between the suspension wires 1 on the movable section side is liable to be different from that between the wires 1 on the stationary section side. Hence, the tilt characteristic is low when the lens is moved in the focusing direction. In the case where the wire distance between the first ends of the wires is not equal to that between the remaining second ends of the wires, the optical axis of the objective lens is not perpendicular to the surface of the optical disk. Furthermore, the objective lens drive device suffers from the comatic aberration and the increase in jitter of the signal when the tilt characteristic is lowered.

SUMMARY OF THE INVENTION

Accordingly, an object of the invention is to eliminate the above-described difficulties accompanying a conventional objective lens drive device. More specifically, an object of the invention is to provide an objective lens drive device in which the lengths of the wires supporting the movable section or the wire distances between the parts of the wires which are near the ends thereof are scarcely fluctuated, and a method of manufacturing the objective lens drive device.

Another object of the invention is to provide an objective lens drive device which is simple in construction and is high both in tilt characteristic and in productivity, and a method of manufacturing the device.

According to the present invention, it is provided an objective lens drive device, in which a movable section having an objective lens is supported by suspension wires extended from a stationary section, and the wires are positioned by guide holes formed in the movable section or stationary section; in that the suspension wires are fixedly positioned in such a manner that the wires are in contact with the inner walls of the guide holes.

A manufacturing method for an objective lens drive device, in which a movable section having an objective lens is supported by suspension wires extended from a stationary section, and the wires are positioned by guide holes formed in the movable section or stationary section; in that when the suspension wires are fixed, the suspension wires are positioned by bringing the suspension wires in contact with the inner walls of the guide holes, and the suspension wires are fixed under the wires being in contact with the inner walls of the guide holes.

Furthermore, an objective lens drive device in which a movable section having an objective lens is supported by suspension wires extended from a stationary section, in that the suspension wires are secured to the stationary section and the movable section by insert molding, and the suspension wires are bent.

Moreover, the objective lens drive device in which, a focusing coil or a tracking coil is soldered directly to the wires.

Still further, a method of manufacturing an objective lens drive device in which a movable section having an objective lens is supported by suspension wires extended from a stationary section; in that gaps are formed in a metal mold which is provided for securing the wires to the stationary section and the movable section by insert-molding, the gaps being utilized to bend the suspension wires in a tracking direction.

DETAILED DESCRIPTION OF THE PREFERRED EMBODIMENTS

First Embodiment

Figure 1:
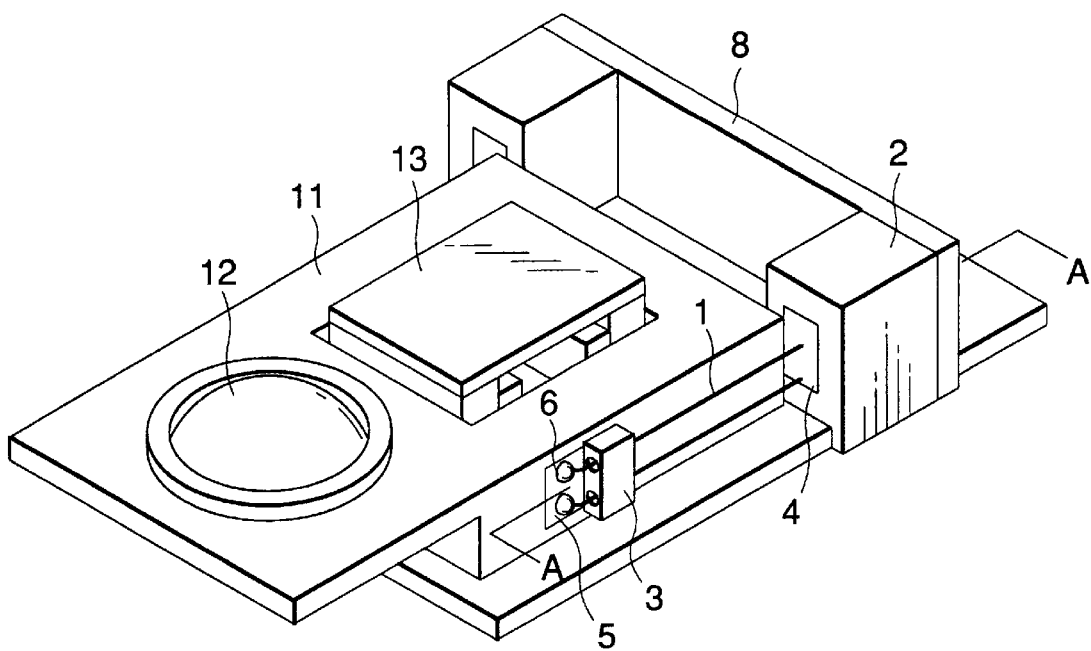
FIG. 1 is a perspective view of an objective lens drive device of a wire support type.

FIG. 1 is a perspective view showing an objective lens drive device in an optical pickup device according to the invention. In the device, the stationary section comprises: a magnetic circuit 13 including a permanent magnet and a yoke; wire bases 2, and a base substrate 8, while the movable section comprises: an objective lens 12, holder substrates 5, and a lens holder 11 having a focusing coil and a tracking coil.

The movable section is supported by suspension wires 1 extended from the stationary section. First ends of the wires 1 are inserted into guide holes formed in wire guide sections 3 of the lens holder 11, and fixedly secured to the holder substrates 5, respectively. The remaining second ends of the wires are inserted into guide holes formed in the wire bases 2, and fixedly secured to the base substrate 8. The wire bases 2 have recesses, into which damper material 4 is filled to suppress the resonance of the objective lens drive device.

The above-described objective lens drive device may be so modified that the magnetic circuit is provided on the movable section side, and the focusing coil and the tracking coil are provided on the stationary side.

A wire fixing method in the objective lens drive device of the invention will be described with reference to FIGS. 2A to 2D, which are sectional views taken along line A—A in FIG. 1.

Figure 2A:
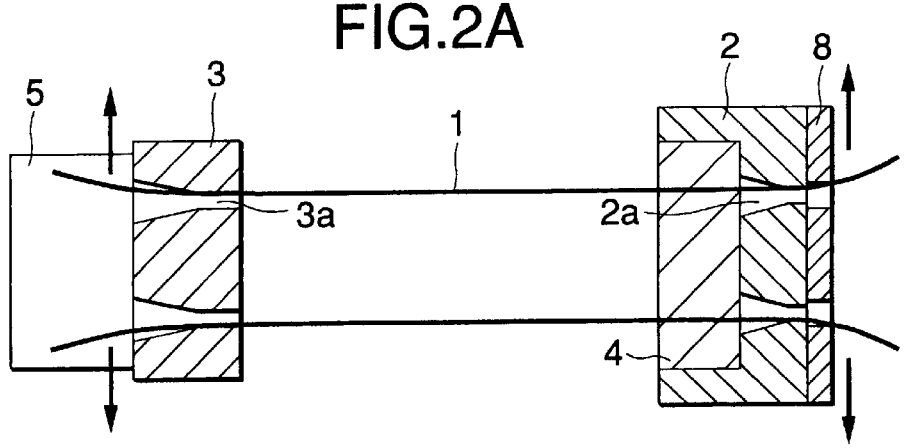
FIGS. 2A to 2D are diagrams for a description of a method of positioning and fixing wires, and the wires thus fixed.

In the objective lens drive device of the invention, as shown in FIG. 2A, the suspension wires 1 are fixedly soldered to the base substrate 8 (as indicated at 7 in FIG. 2B) in such a manner that the wires are in contact with the inner walls of the guide holes 2a of the wire base. Similarly, the suspension wires 1 are fixedly soldered to the holder substrate 5 (as indicated at 6 in FIG. 2B) in such a manner that the suspension wires 1 are in contact with the inner walls of the guide holes 3a of the wire guide 3. The term "inner wall" as herein used is intended to mean the surface of a part Hs which is formed when a guide hole H is formed as shown in FIG. 2D.

Figure 2B:
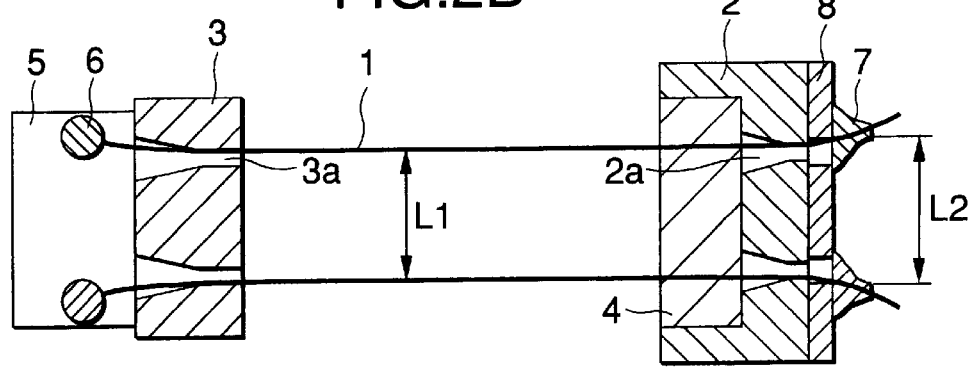

In the case where the suspension wires 1 are fixed in the above-described manner, the suspension wires 1 as shown in FIG. 2B are fixed in such a manner that they are in contact with the inner walls of the guides holes 2a and 3a. Hence, even if there is a gap between each of the wires 1 and the respective guide holes 2a, the positions of the wires thus fixed are scarcely fluctuated.

Accordingly, the upper wire 1 and the lower wire 1 are equal in length to each other, and the wire distance L1 on a side of the movable section and the wire distance L2 on a side of the stationary section are also equal to each other.

Figure 2C:
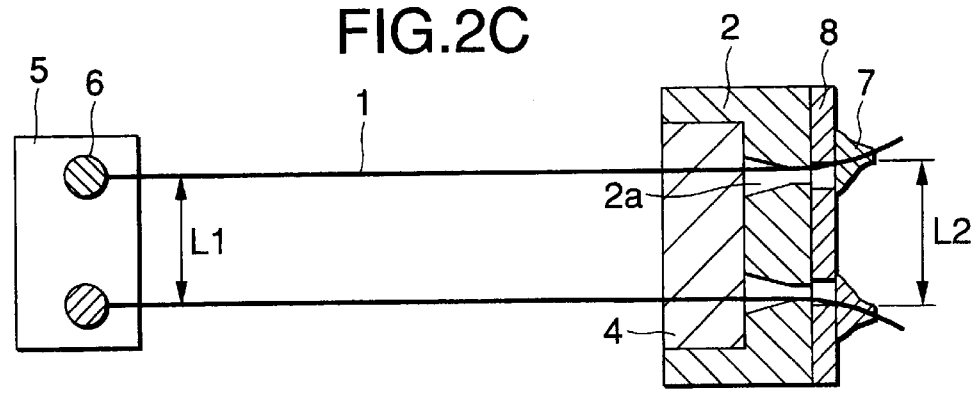
Figure 2D:
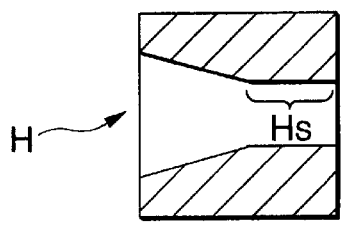

As shown in FIG. 2C, the following method may be employed: No guide holes are formed on the holder substrate side, and a jig is used, or an insert molding method is employed to secure the wires 1 to suitable positions on the holder substrate 5, and only the wires on the side of the base substrate 8 are secured in the above-described method.

The inclination of the objective lens which occurs during an focusing operation, will be described with reference to FIGS. 3A and 3B.

Figure 3A:
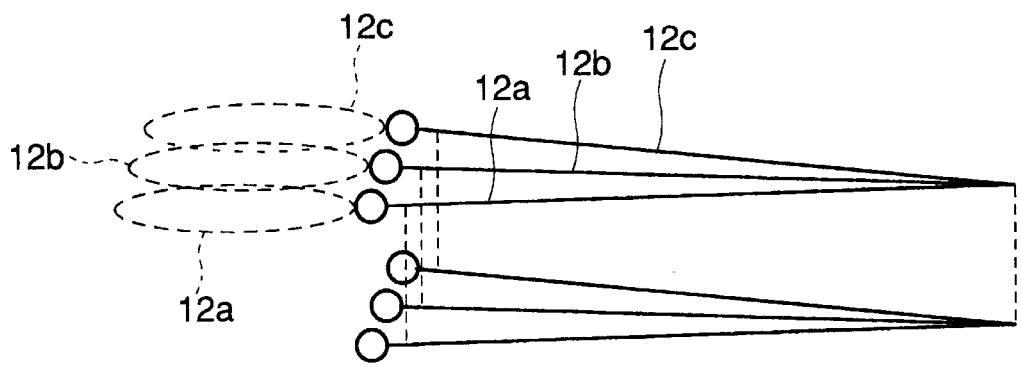
FIGS. 3A and 3B are diagrams for a description of the inclination of the objective lens in the objective lens drive device.
Figure 3B:
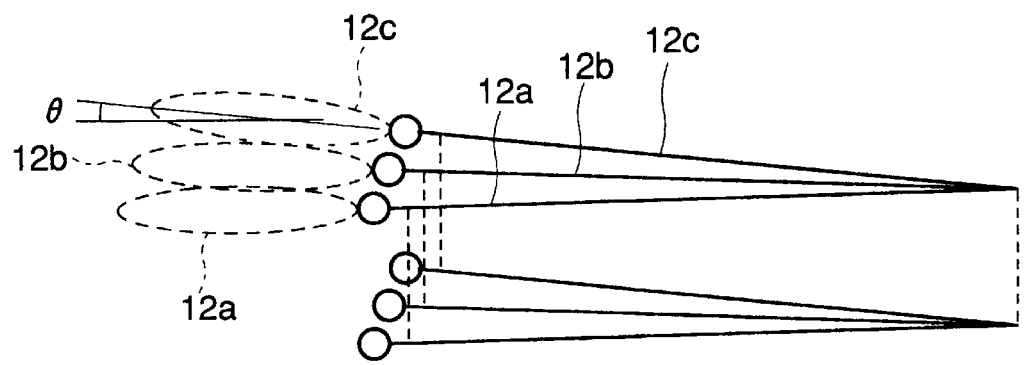

In the case where the lengths of the upper and lower wires are equal to each other, and the wire distances between the parts of the wires which are near the ends thereof are equal to each other, the movement of the objective lens as shown in FIG. 3A; that is, even if the objective lens are moved as indicated at 12a, 12b and 12c, the movement is a parallel movement; in other words, the objective lens will not be inclined.

On the other hand, in the case where the lengths of the upper and lower wires are not equal to each other or the wire distances between the parts of the wires which are near the ends thereof are not equal to each other, the movement of the objective lens is not a parallel movement. When the objective lens is moved to the position 12c, it is inclined at an angle θ.

When the objective lens is inclined at an angle θ, the light beam applied to the surface of the optical disk suffers from a comatic aberration. As a result, the reproduced signal is increased in jitter. Accordingly, by suppressing the inclination of the objective lens, the jitter of the reproduced signal can be decreased.

In the case of FIGS. 2A to 2D, the suspension wires are fixed in such a manner that they are in contact with the upper and lower parts of the inner walls of the guide holes, respectively; however, as shown in FIGS. 4A to 4D (the horizontal sectional view of the objective lens drive device), the suspension wires may be fixedly secured in such a manner that they are in contact with the right or left parts of the inner walls, respectively.

Figure 4A:
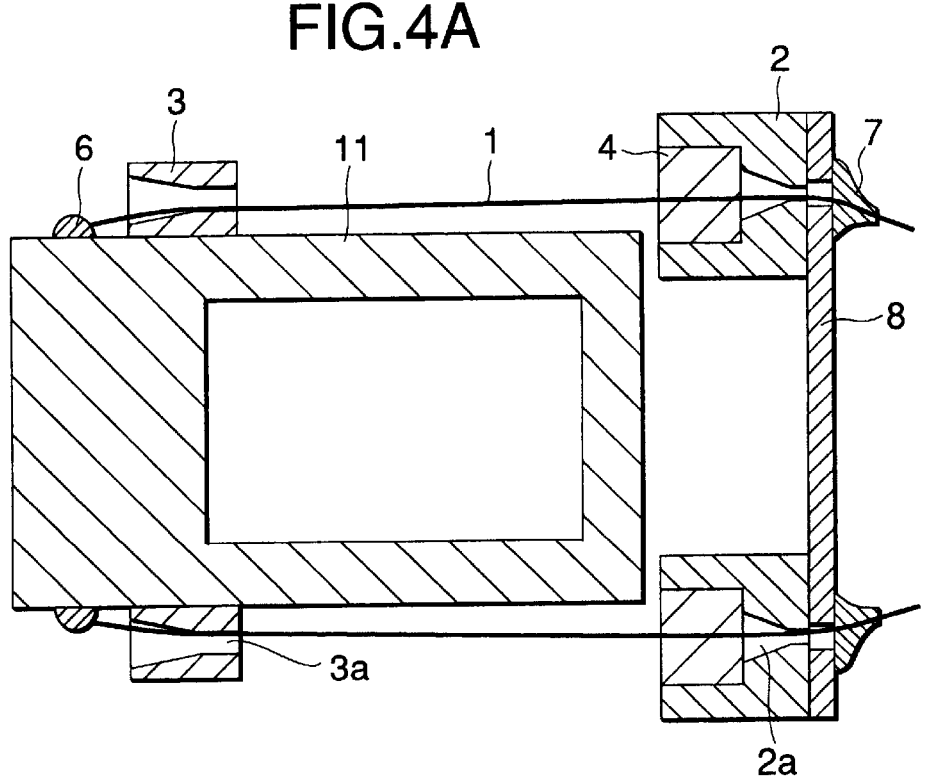
FIGS. 4A to 4E are diagrams showing the contact of suspension wires with the inner walls of guide holes (as viewed from above)
Figure 4B:
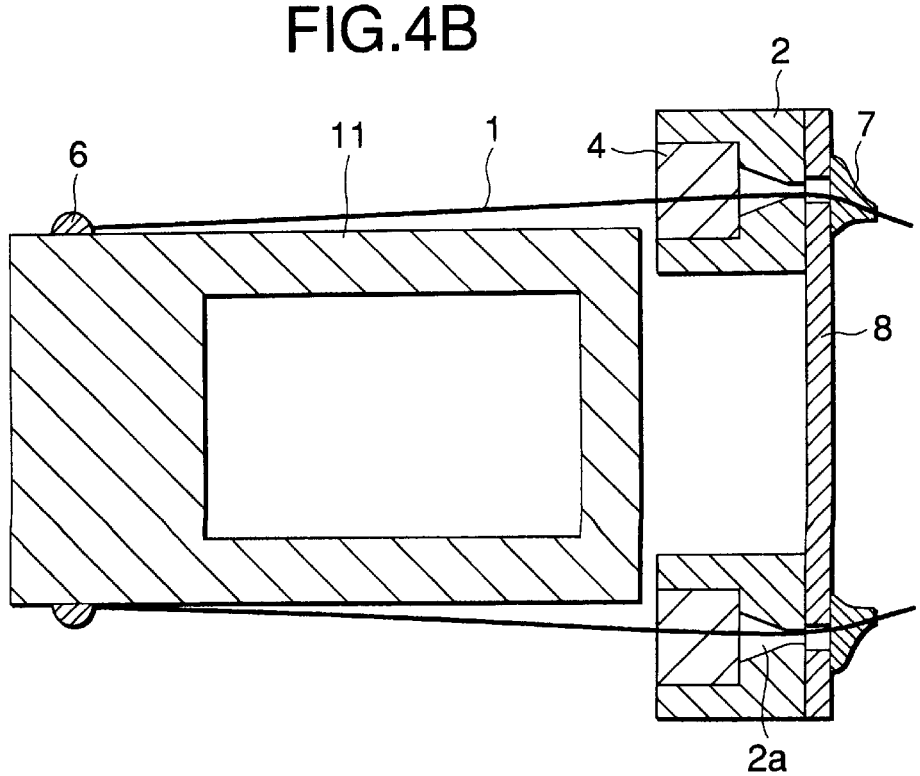
Figure 4C:
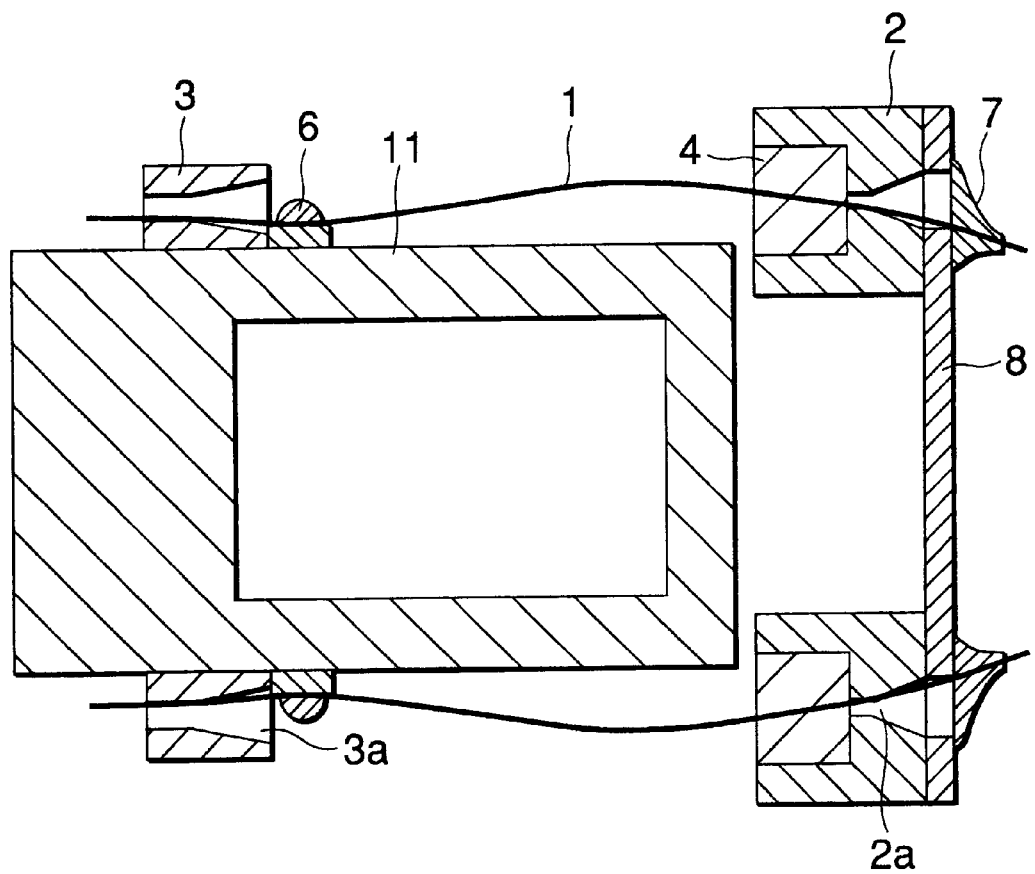

Further, as shown in FIG. 4C, the guide holes may have tapered figures in that a diameter of opening of a guide hole toward a movable section side is smaller, while that toward the stationary section side is larger. According to this configuration, when manufacturing, the suspension wire can be inserted from the stationary section which has a larger guide opening to the movable section by a predetermined length. Then, the suspension wire is fixed and cut off at the stationary section side. Because of the movable section being supported by the suspension wires which are fine elastic member, the movable section may be moved even if a weak force is applied. Therefore, the cutting work is difficult to perform at the side of the movable section where is narrow in space. Thus, it is advantageous in manufacturing that the cutting work is performed at the side of the stationary section.

Figure 4D:
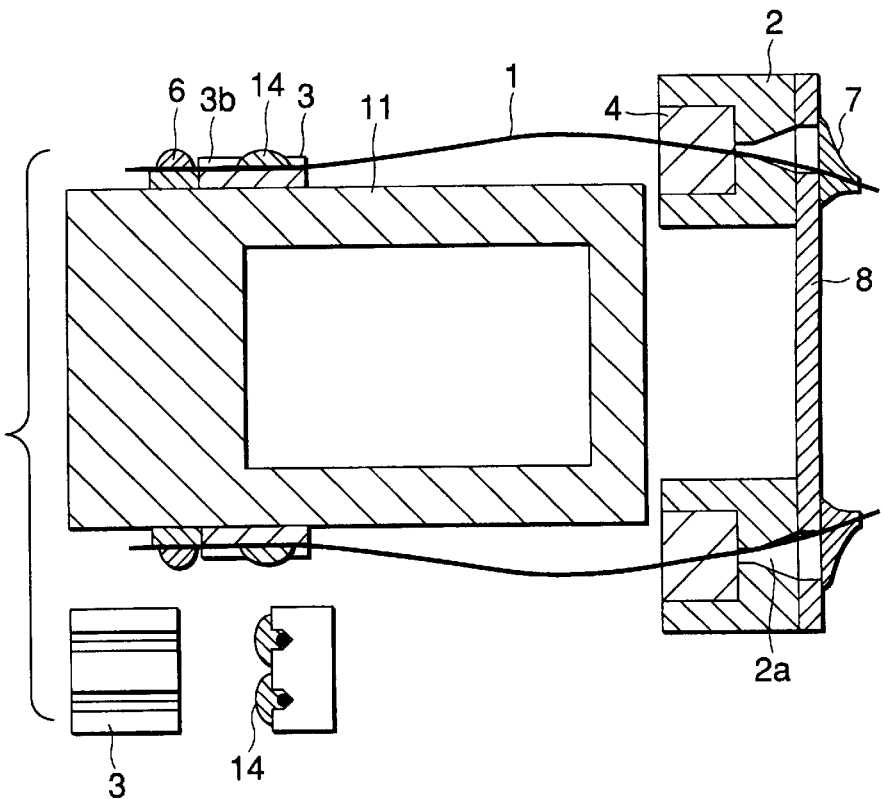
Figure 4E:
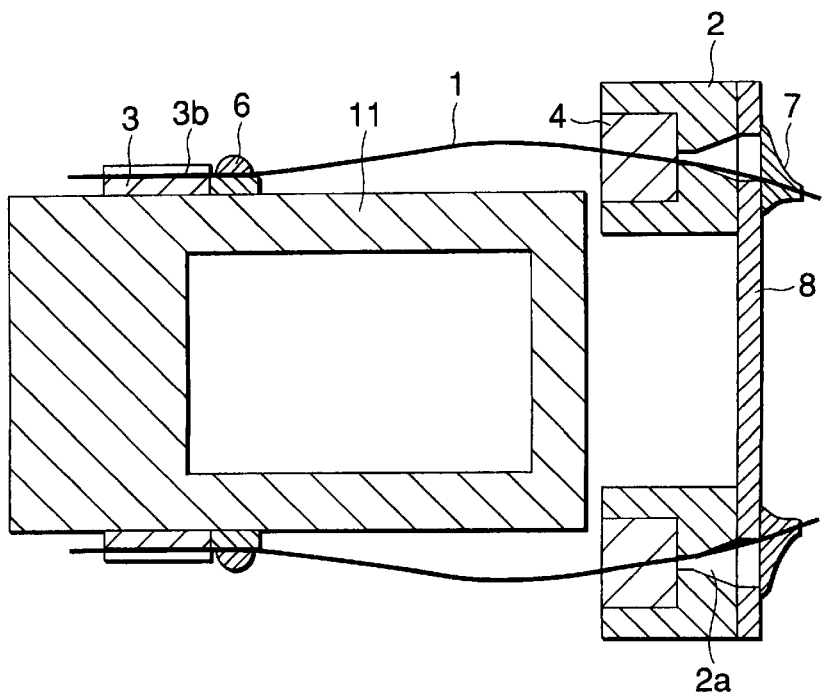

Furthermore, as shown in FIG. 4D, the guide part 3 of the movable section may have guide groove 3a. One end of the suspension wire 1 is brought in contact with the guide groove 3a, then fixed by an adhesive 14 e.g. UV hardening resin, so that the suspension wire is positioned and fixed. If a cross-section of the groove has a V-shape, an accuracy of the positioning can be enhanced. Further, as shown in FIG. 4E, the guide part 3 may be placed just behind the soldering 6. In this configuration, it is not necessary to fix the wire by the adhesive.

Figure 5:
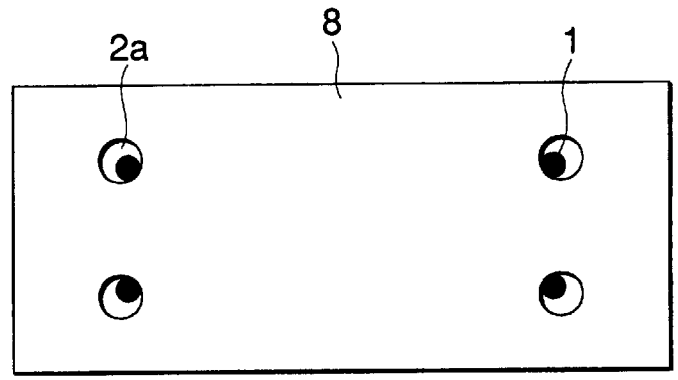
FIG. 5 is a diagram showing the contact of wires with the inner walls of the guide holes (as viewed from the base substrate side)

In the case where the lengths of the wires are equal to each other, and the wire distance between the parts of the wires which are near the ends thereof are equal to each other, then the wires may be secured to the parts of the inner walls of the guide holes other than the upper, lower, right and left parts of the inner walls. For instance, as shown in FIG. 5 (the side view of the objective lens drive device as viewed from the base substrate side), the wire may be fixed in such a manner that they are in contact with the parts of the inner walls which are located 45° obliquely downwardly or upwardly.

Moreover, according to the objective lens drive device, when fixing the suspension wire by soldering, because a force is applied in a direction to make the suspension wire contact with the inner wall of the guide holes, the suspension wire is fixed under the curved condition, thereby to effectively suppress the high frequency resonance.

As was described above, in the objective lens drive device of the invention, the wires holding the movable section are positioned by bringing them into contact with the inner walls of the guide holes. Since, under this condition (that the wires are kept in contact with the inner walls of the guide holes), the wires are fixed, the fixed positions of the wires are scarcely fluctuated.

In other words, in the objective lens drive device of the invention, the lengths of the wires are equal to each other, and the wire distances between the parts of the wires which are near the ends of the wires are equal to each other. This feature suppresses the increase in jitter of the reproduced signal which is due to the inclination (comatic aberration) of the objective lens.

Further, if the guide hole of the movable section is replaced by a guide groove, the movable section can be small in size. If a cross-section of the groove has a V-shape, an accuracy of the positioning can be enhanced.

In the objective lens drive device of the invention, when the suspension wires are fixed, the suspension wires are positioned by bringing them into contact with the inner walls of the guide holes, and under this condition (that the wires are kept in contact with the inner walls of the guide holes) the wires are fixed. Hence, the wires can be fixed at their suitable positions with ease (where the lengths of the wires are equal to each other, and the wire distance between the parts of the wires which are near the ends of the wires are equal to each other).

Second Embodiment

An objective lens drive device of the invention, and a method of manufacturing the device will be described.

The stationary section and the movable section of the objective lens drive section of the invention is made of plastic resin such as PPS (polyphenylene sulfide) and liquid crystal polymer, and formed with a metal mold. The stationary section and the movable section are formed at the same time. In this formation, suspension wires are inserted in those sections (insert molding).

Figure 6:
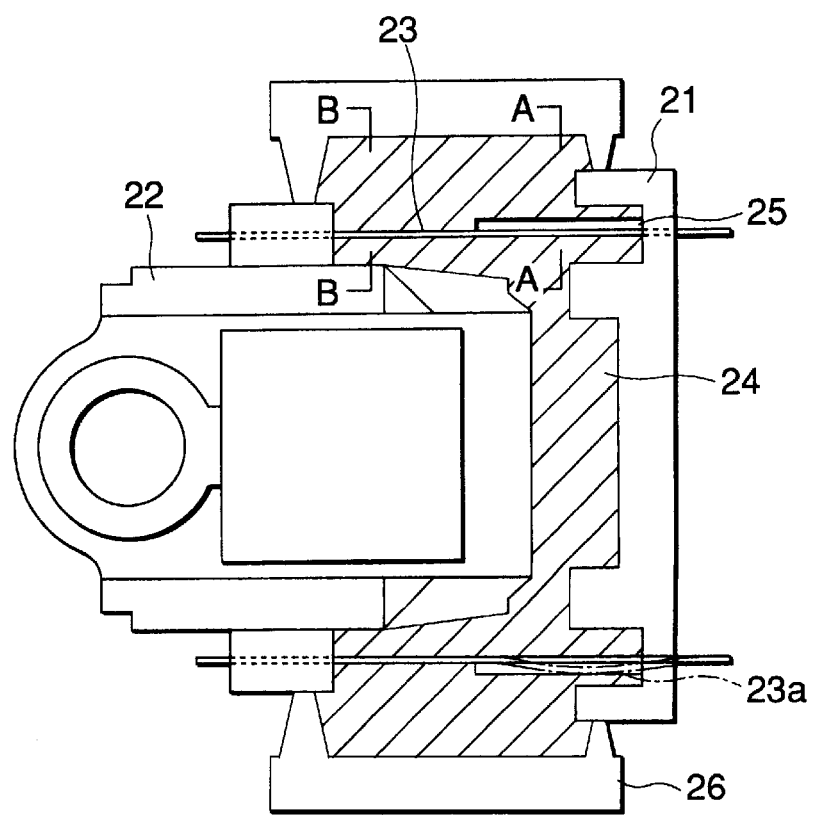
FIG. 6 is a plan view showing a method of molding a stationary section and a movable section in an objective lens drive device according to the invention.

FIG. 6 shows the stationary section 21, the movable section 22, the metal mold 24, and the suspension wires 23 in the case where the movable section and the stationary section are formed by insert molding. With respect to the metal mold 24, only the parts which hold the suspension wires 23 is shown.

In the metal mold 24, the parts which hold the suspension wires has gaps 25. The gaps 25 are provided in a direction in which the wires are to be bent (in a tracking direction).

Figure 7A:
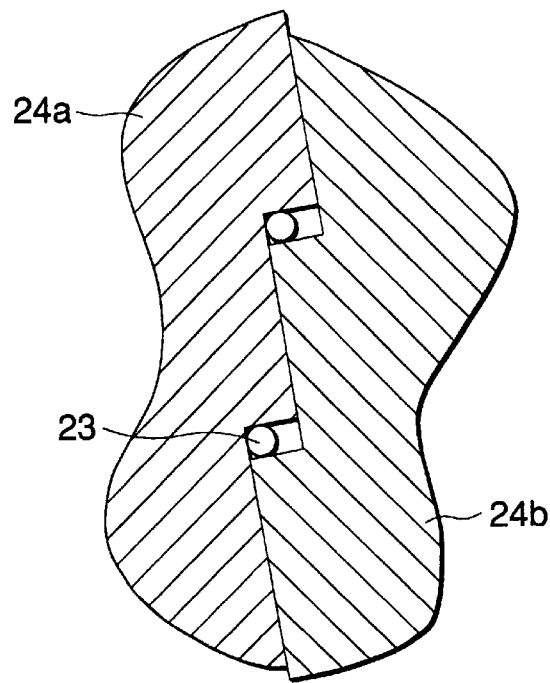
FIGS. 7A and 7B are sectional views showing the suspension wire holding portions of a metal mold for forming the objective lens drive device according to the invention.
Figure 7B:
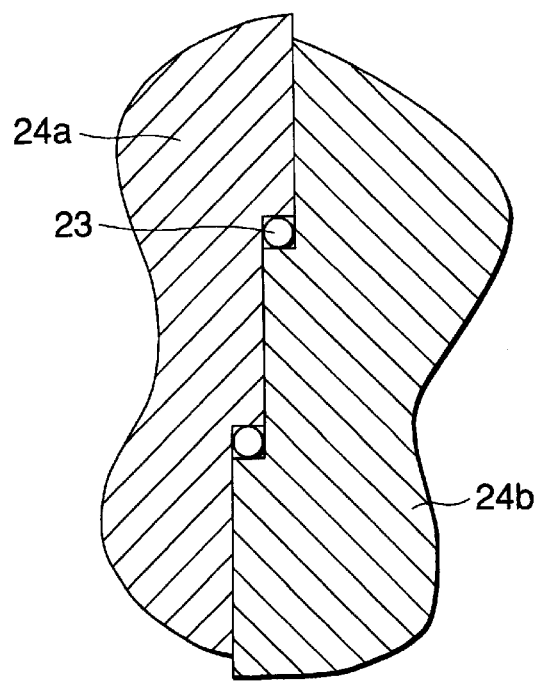

FIG. 7A is a sectional view taken along line AA' in FIG. 6, showing parts of an upper metal mold 24a and of a lower metal mold 24b. Similarly, FIG. 7B is a sectional view taken along line BB', showing other parts of the upper metal mold 24a and the lower metal mold 24b. At the section AA' where the suspension wire should be bent, the part holding the suspension wire is wide in the tracking direction.

Figure 8:
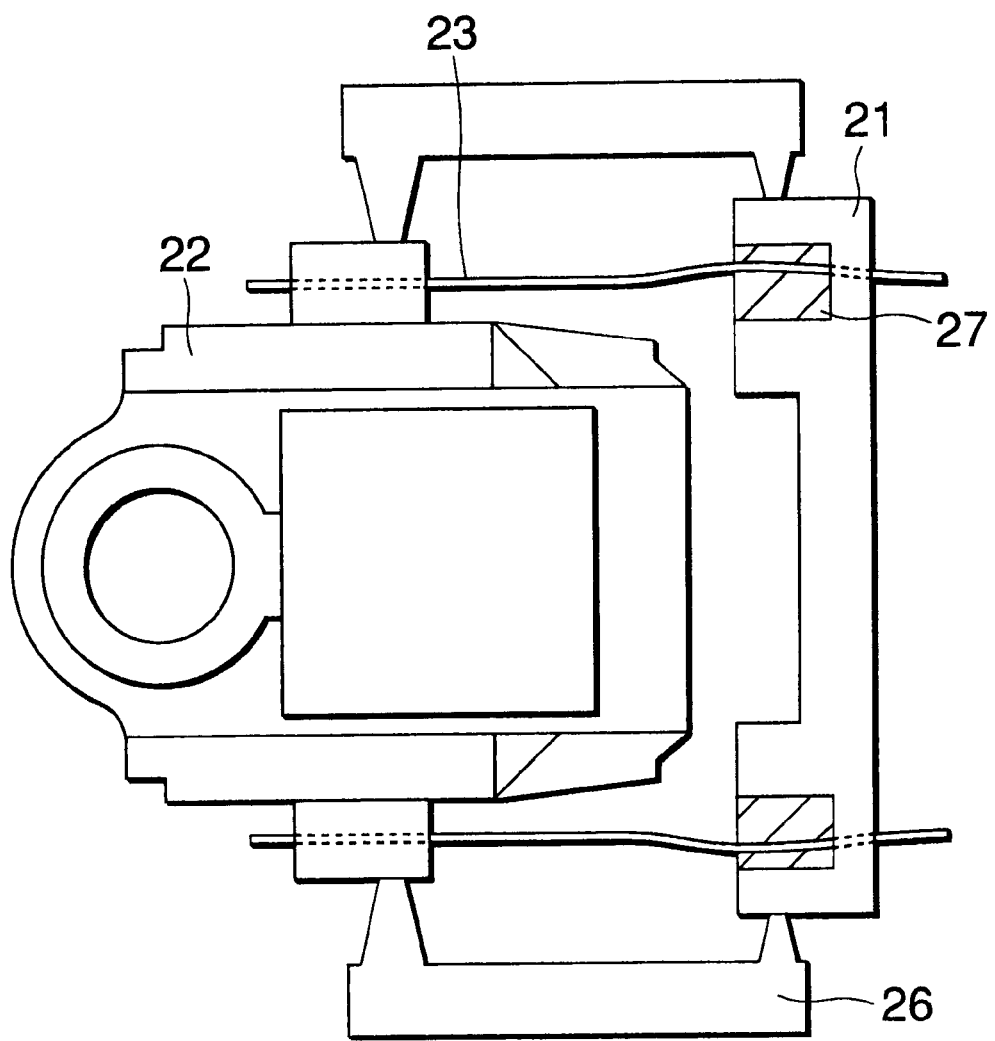
FIG. 8 is a plan view showing the stationary section and the movable section which are formed with the aforementioned meal mold.

Before or during molding, a force is applied to the suspension wire 23 to bend the latter 23 as indicated at 23a, and under this condition the stationary section and the movable section are formed. The wire bending force is not particularly limited; that is, it may be a resin injecting pressure employed during molding, or the mechanical force of a mechanism which is additionally provided. As a result, the suspension wires 23 are secured to the stationary section 21 and the movable section 22 in such a manner that they are bent outwardly in the tracking direction as shown in FIG. 8.

It is preferable that the stationary section 21 is coupled to the movable section 22 with bridges 26. In this case, the movable section 22 is prevented from being vibrated. Hence, the assembling work (for instance, bonding of the focus coil, the tracking coil, and the objective lens) is improved in work efficiency. After the assembling work, the bridges are removed from the device body.

Figure 9:
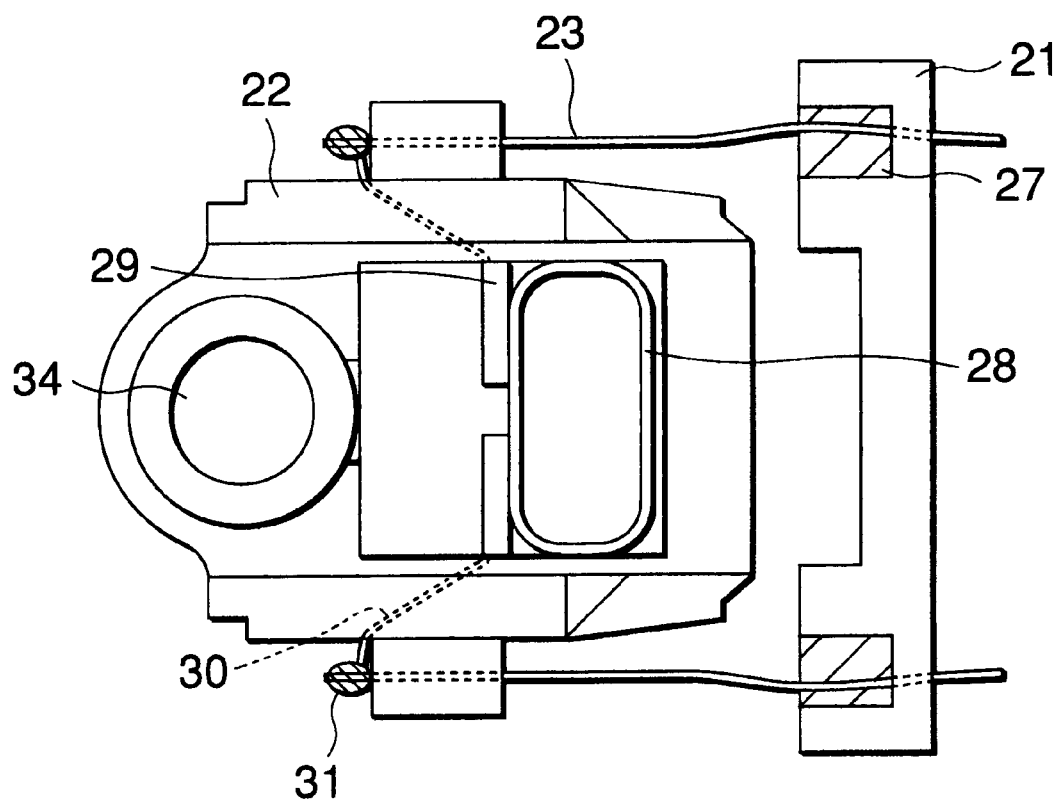
FIG. 9 is a plan view showing the arrangement of an objective lens, a focusing coil, and a tracking coil.
Figure 10:
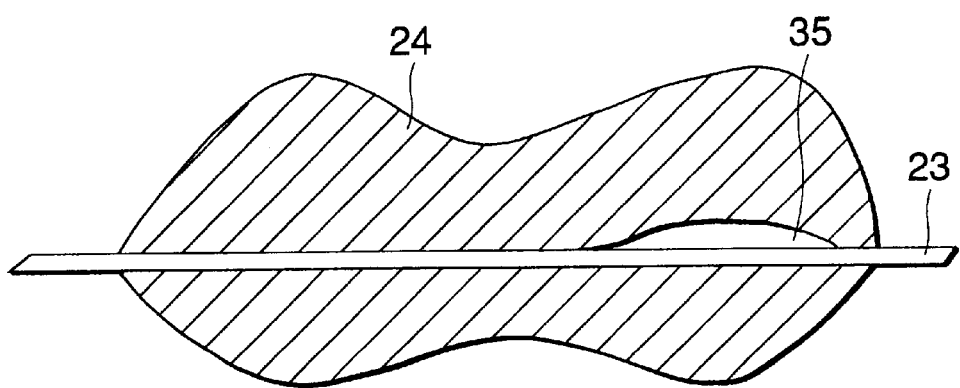
FIG. 10 is a plan view showing a gap formed to bend the suspension wire.

As shown in FIG. 9, the objective lens 34 is bonded to the movable section (or lens holder) 22. In the case of an objective lens drive device of the type that the focus coil 28 and the tracking coil 29 are secured to the movable section 22, those coils 28 and 29 are also bonded to the movable section 22.

Thereafter, the focusing coil 28 and the tracking coil 29 are electrically connected to the suspension wires 23. In the objective lens drive device of the invention, the suspension wires 23 have been secured to the movable section 22, and therefore, without use of a relaying printed circuit board for fixing the wires 23, the lead wires of the focusing coil 28 and the tracking coil 29 can be connected to the wires 23 by soldering (as indicated at 31). At the stationary section, too, it is unnecessary to use a relaying printed circuit board to fix the suspension wires 23.

The stationary section 21 has recesses which are filled with damper material 27. In order to sufficiently obtain a resonance suppressing effect (a high frequency resonance suppressing effect), it is necessary to cover a part or the whole of the bent portion of each of the wires 23 with the damper material 27.

The characteristic of the objective lens drive device in which, as was described, the wires are bent in the tracking direction was evaluated. The resonance is small, and, when the lens is moved in the focusing direction, the tilt characteristic was satisfactory.

Figure 11:
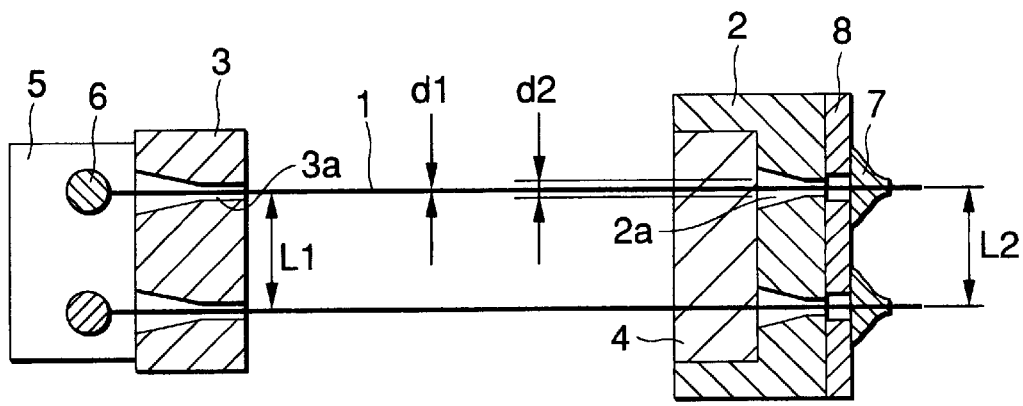
FIG. 11 is a diagram showing the state of fixed suspension wires in a conventional objective lens drive device.
Figure 12:
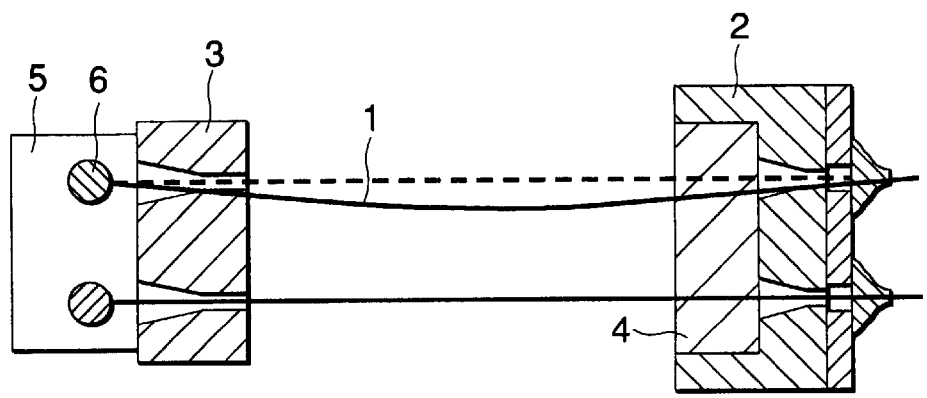
FIG. 12 is a diagram showing the suspension wire fixing portions of the conventional objective lens drive device.

In the objective lens drive device of the invention, the gaps (formed in the metal mold or the jig) for bending the wires are not particularly limited. For instance, the gaps may be arcuate as indicated at 35 in FIG. 11.

The technical concept of the invention may be equally applied to an optical pickup device in which the focusing coil and the tracking coil are provided on the stationary section side while the permanent magnet is provided on the movable section side.

As is apparent from the above description, the objective lens drive device of the invention has the following effects or merits:

In the device, the suspension wires 23 are bent in the tracking direction. Hence, when the lens is moved in the focusing direction, the tilt of the objective can be reduced, and the resonance suppressing effect (or the high frequency resonance suppressing effect) is satisfactory.

In the device, because the suspension wires 23 are fixedly secured to the stationary section and the movable section by insert molding, the assembling work of the device is achieved with high efficiency. Additionally, the suspension wires can be secured with high accuracy, the lengths of the suspension wires and the wire distance between the parts of the wires which are near the ends of the wires are equal to each other. Accordingly, it is suppressed the increase in jitter of the reproduced signal which is due to the inclination (comatic aberration) of the objective lens.

In the device, the suspension wires are secured directly to the stationary section and the movable section. Therefore, the device is relatively small in the number of components and is reduced in component cost as much.

What is claimed is:

1. An objective lens drive device comprising:
   a stationary section;
   suspension wires extended from said stationary section;
   a movable section having an objective lens and being supported by said suspension wires;
   wherein at least one of said stationary section and said movable section has guide holes into which said suspension wires are inserted, and
   wherein said suspension wires are fixedly positioned in such a manner that said suspension wires are in contact with inner walls of said guide holes.

2. An objective lens drive device as claimed in claim 1, wherein said guide holes are formed in both of said stationary section and said movable section.

3. An objective lens drive device as claimed in claim 2, wherein said guide holes have a taper-shape in that a diameter of an opening toward said movable section is smaller than that toward said stationary section.

4. An objective lens drive device as claimed in claim 1, wherein said guide holes are formed in said stationary section, and guide grooves are formed in said movable section, and
   wherein ends of said suspension wires of said movable section are fixedly positioned in such a manner that said suspension wires are in contact with said guide grooves.

5. An objective lens drive device as claimed in claim 4, wherein said guide grooves have a V-shaped cross section.

6. An objective lens drive device as claimed in claim 1, wherein said guide holes have a taper-shape in that a diameter of an opening toward said movable section is smaller than that toward said stationary section.

7. An objective lens drive device as claimed in claim 1, wherein said suspension wires are brought into contact with said inner wall of said guide holes under a condition that the suspension wires are elastically deformed.

8. An objective lens drive device as claimed in claim 1, wherein said suspension wires are bent outwardly in a tracking direction.

9. A manufacturing method of an objective lens drive device in which a movable section having an objective lens is supported by suspension wires extended from a stationary section, and said suspension wires are positioned by guide holes formed in at least one of said movable section and said stationary section, said method comprising the steps of:
   fixing first ones of said wires to said movable and stationary sections such that said suspension wires are made in contact with the inner walls of said guide holes; and fixing second ones of said suspension wires adjacent to said first suspension wires in contact with the inner walls of said guide holes.

10. A manufacturing method of an objective lens drive device comprising the steps of:

provide a stationary section having first guide holes which have a taper shape in that said first guide holes open widely in a direction from a movable section toward said stationary section;

providing said movable section including a guide member having second guide holes which have a taper shape in that said second guide holes open widely in a direction from said movable section toward said stationary section;

inserting a wire by a predetermined length to reach said second guide hole from a wide opening of said first guide hole;

positioning said wire by contacting with an inner wall of said guide holes;

fixing said wire at predetermined positions in said stationary section and said movable section;

cutting said wire at said stationary section.

11. An objective lens drive device comprising:

a stationary section;

suspension wires extended from said stationary section;

a movable section having an objective lens and being supported by said suspension wires;

wherein said suspension wires are secured to said stationary section and said movable section by insert molding, and said suspension wires are bent in a tracking direction.

12. An objective lens drive device as claimed in claim 11, wherein a focusing coil or a tracking coil is soldered directly to said suspension wires.

13. A method of manufacturing an objective lens drive device in which a movable section having an objective lens is supported by wires extended from a stationary section, comprising the steps of:

forming gaps in a metal mold for securing said wires to said stationary section and said movable section by insert-molding, bending said suspension wires in said gaps in a tracking direction.

14. A method of manufacturing an objective lens drive device in which a movable section having an objective lens is supported by suspension wires extended from a stationary section, said method comprising the steps of:

providing a stationary section having guide holes which have a taper shape that opens widely in a direction from a movable section toward said stationary section;

providing said movable section having a guide member having guide grooves;

inserting a wire by a predetermined length to reach said guide groove of said guide member from a wide opening of said guide hole of the stationary section;

positioning said wire by contacting an end of said wire with said guide grooves at said movable section, and contacting said wire with an inner wall of said guide holes at said stationary section;

fixing said wire at predetermined positions in said stationary section and said movable section;

cutting said wire at said stationary section.

15. A method of manufacturing an objective lens drive device as claimed in claim 14, wherein said wire is fixed by soldering at said stationary section, while said suspension wire is fixed by adhesive at said movable section.

16. A method of manufacturing an objective lens drive device as claimed in claim 14, wherein an end of said wire is fixed by soldering at said stationary section, while the other end of said wire is fixed by soldering just before said guide member.

* * * * *